June 25, 1929.　　J. E. FITZGIBBON　　1,718,919

STOCKING TAG

Filed May 15, 1928

INVENTOR
John E. Fitzgibbon,
BY
Warren S. Orton
ATTORNEY

Patented June 25, 1929.

1,718,919

UNITED STATES PATENT OFFICE.

JOHN E. FITZGIBBON, OF MILWAUKEE, WISCONSIN, ASSIGNOR TO PHOENIX HOSIERY COMPANY, OF MILWAUKEE, WISCONSIN, A CORPORATION OF WISCONSIN.

STOCKING TAG.

Application filed May 15, 1928. Serial No. 278,034.

The invention relates in general to a merchandising tag or rider provided with a color harmony chart adapted to be attached to colored fabric articles in vending the same, and the invention particularly relates to such a tag designed to be secured to hosiery and especially to the different shades of women's stockings now in general use.

There are at present on the market a multitude of different colored shades of hosiery especially women's stockings and the manufacturers are striving daily to present new and unusual shades and tones. The discriminating and carefully dressed purchaser who desires harmony in the color scheme of her apparel, and which harmony may be either by contrast or by combination, has difficulty when selecting a pair of stockings, especially where they are of an unusual or novel shade, to determine whether any particular color or shade which she might select harmonizes with the balance of the apparel outfit with which the stockings are intended to be worn. The decision as to proper color harmony is usually too difficult to be determined by the average purchaser and this is particularly true of a person purchasing hosiery under conditions where it is not usually possible to compare the color of the selected stocking with the color or colors of the other articles of apparel with which the stocking is to be worn. Further, the proper combination of colors and particularly the proper combination of shades and tones of similar colors is a matter for an expert in color selection, and the usual purchaser is not sufficiently skilled in color selection to determine under the usual purchasing conditions whether any two particular colors will harmonize when brought into combination.

Accordingly, the primary object of the invention is to provide a simplified means for advising the purchaser of hosiery of the colors which will best harmonize with the color of any particular hose offered for sale.

Broadly, this is attained by the stocking manufacturer expertly selecting those colors, shades and tones which will best harmonize with any particular color of hosiery manufactured and by supplying this information in the form of a color chart supplied with each pair of hosiery.

Still another object of the invention is to provide a pleasing arrangement of any such suggested colors disposed in such way that they may be readily compared with the color of the hosiery to which they are attached. This ready comparison of the colors in the color chart with the color of the hosiery is attained by locating all the colored area forming the chart in juxtaposition to the fabric of the stocking and disposed in such way that all the colored areas of the chart except any one way be blocked off thus leaving the selected color adjacent the fabric of the stocking.

Still another object of the invention is to arrange the colors in such way as they will be protected by the fabric of the hose to which they are attached and in this way tend to minimize any deleterious action such as exposure to strong light or store handling which might affect the initial brilliancy of the colors of the chart.

Various other objects and advantages of the invention will be in part obvious from an inspection of the accompanying drawing and in part will be more fully set forth in the following particular description of one form of tag or rider embodying my invention, and the invention also consists in certain new and novel features of construction and combination of parts hereinafter set forth and claimed.

Figure 1:
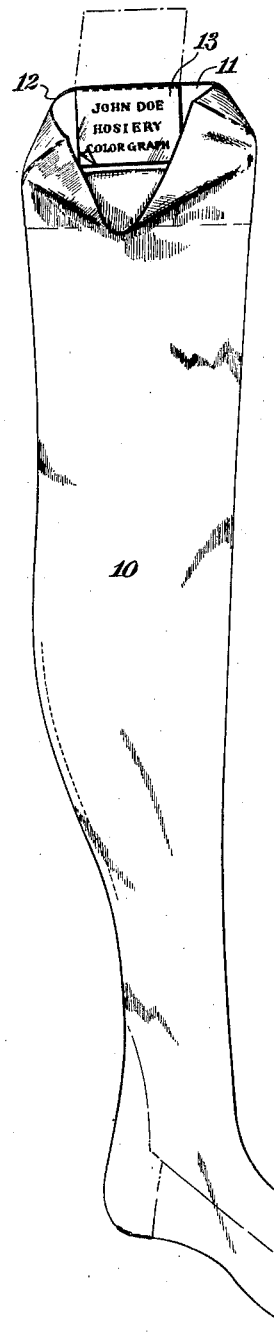
Fig. 1 is a view in side elevation of a stocking with one side of the top folded down into open position to display a tag constituting a preferred embodiment of the invention.

In the drawings and referring first to Fig. 1 there is shown a stocking 10, the upper open end 11 of which is defined by a top edge 12.

Temporarily secured to the upper end 11 of the stocking is a rider or tag 13. This tag is preferably pasted to the inner side of the stocking fabric as is usual in securing known forms of riders and tags to articles of this sort. In the form of the invention shown in Figs. 1 and 2, the tag is a rectangular card adapted to be folded along the dotted line 14 and thus forms a lower portion 15 adapted to be secured to the fabric and a flap 16 adapted normally to be folded down on top of the portion 15 as indicated in full lines in Fig. 1. The card is arranged with its folding line 14 aligned with the top edge 12 so that the flap 16 may be readily lifted into position elevated above the edge 12, as indicated in dot and dash lines in Fig. 1 and in full lines in Fig. 2. The portion 15 may be utilized for displaying any textual matter usually found on hosiery rider tickets such as the manufacturer's name shown at 17. A color chart 18 is positioned on the under or inner side of the flap 16 when considered in its folded position as shown at Fig. 1. This chart is formed of a plurality of areas 19 of different colors, shades and tones. In the illustrated showing, the areas are disposed radially and in an artistic fluted edge semi-circle. The colors of the areas are selected by stylists and color experts to harmonize, either by comparison or by counter effect with the color, shade or tint of the stocking 10 or of the color of that portion of the stocking 10 which is visible under the usual wearing conditions. For instance, assuming that the stocking 10 is of the color known as dove gray, then the eight colored areas shown in the chart 18 are black, navy, dark red, violet, dark green, brown and beige.

Figure 2:
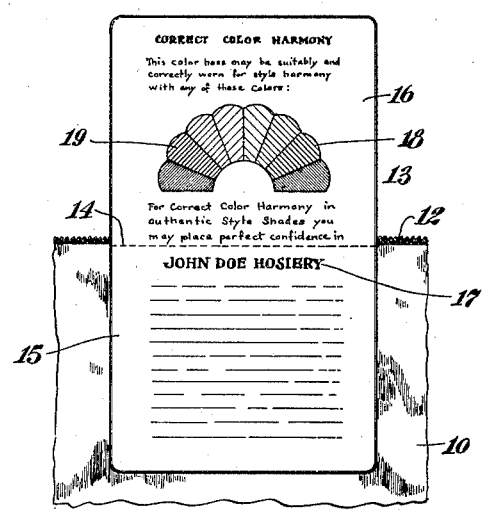
Fig. 2 is an enlarged showing of the folded tag in Fig. 1 with its flap raised into its open position as indicated in dot and dash lines in Fig. 1 to display the normally concealed color chart.

Folding the flap 16 downwardly from the position shown in Fig. 2 and disposing the same within the outline of the stocking when in its normal folded position boxed for storage, has the effect of protecting the flap from becoming accidentally torn away from the stocking. This closing down of the flap with the color chart concealed has the additional advantage that it protects the delicate coloring matter in the colored areas from the deleterious effects of sunlight and other marring agencies such as smearing from finger marks.

Figure 3:
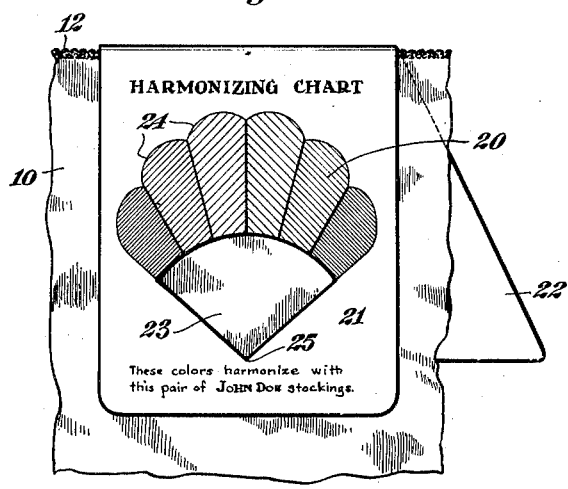
Fig. 3 is a slightly modified form of the tag shown in the preceding figures.

In the modified form of the tag shown in Fig. 3, the color chart 20, corresponding to the chart 18 in Fig. 2, is positioned on the part 21 of the tag which is secured to the fabric and which corresponds to the portion 15 of the tag in Fig. 2. The flap 22 which overlaps the upper edge 12 is designed to be folded from the position shown in Fig. 3 forwardly and into the outline of the stocking to cover the chart carrying portion 21 and thus conceal the chart as indicated in Fig. 1. The flap 22 may also be considered as the flap for engaging the other stocking of the pair following conventional practices in the use of riders in this respect. In this modified form the portion 21 is cut away to provide a triangular shaped opening 23 through which the color of the fabric of the stocking is visible. The colored areas 24 forming the chart 20 are disposed radially of the axis 25 and in juxtaposition to the opening 23 so that a ready comparison between the color or shade of the stocking may be made with any one of the colored areas 24. It is obvious that the character and number of colored areas forming any particular chart will vary with the color of the hosiery with which the particular chart is designed to accompany.

A stocking which is more or less of a neutral tone or color would of course harmonize with a greater number of those colors which are usually worn in women's apparel, than would be the case with a more pronounced or startling color with which there could be associated relatively few harmonizing colors. For instance, in the showing in Fig. 3, there are disclosed only six harmonizing colors in distinction from the eight colors illustrated in the chart shown in Fig. 2.

While the invention has been described in connection with a separate tag or rider for each pair of hosiery and preferably secured in some conventional manner to its associated hose, it is within the scope of the disclosure to supply a single tag or ticket to each box of similar colored or shaded hosiery; and under some circumstances it is obviously possible to secure the chart as a label on the outside of the box in which the hosiery is vended. It is also suggested that the cover flap 22 be omitted, in which case the stocking when in its normal flat boxed position will cover and thus protect the color charts.

In operation and referring to either of the forms of the invention herein disclosed, it is simply required that the sales person or purchaser lift the protecting flap from its closed position as shown in Fig. 1 and there is displayed a selection of colors or shades which have been determined by experts as being proper for use with the stockings to which this tag is secured. The form shown in Fig. 3 is particularly effective in that it permits the purchaser to make her own determination as to whether the color of the stocking fabric visible through the opening 23 harmonizes with any one of the chart colors in which the purchaser is particularly interested.

By means of the device disclosed, it is possible for the hosiery manufacturer to supply valuable assistance to the fastidious purchaser and to assist her in selecting that particular color or shade of stocking which will best harmonize with the color scheme of the outfit with which the stocking is intended to be used. At the same time the purchaser is provided with a convenient means for viewing the color combinations suggested by the hosiery manufacturer.

I claim:

1. In a device of the class described, the combination with a stocking, a tag folded intermediate its length, overlapping the free upper edge of the stocking and removably attached to the stocking, the portion of the tag on the inside of the stocking having an opening through which the fabric of the stocking is visible when the top of the stocking is open slightly to expose said inner portion of the tag, and said tag provided with a plurality of colored areas, disposed in juxtaposition to said opening, the colors of said areas harmonizing with the color of the fabric visible through said opening and the colors of said areas normally concealed in and thus protected by the stocking when in its normal flat condition boxed for storage.

2. The combination of a colored fabric, a tag provided with means for temporarily securing the same to the fabric, said tag provided with an opening through which the color of the fabric is visible, and provided with a colored area in juxtaposition to the opening, the color of said area harmonizing with the color of the fabric.

3. A tag adapted to be secured temporarily to hosiery of a definite color, said tag provided with an opening through which the color of the hosiery may be visible and said tag provided on its exposed side and in juxtaposition to the opening with a plurality of colored areas, the colors of said areas each harmonizing with the color of the hosiery to which the tag is intended to be secured.

4. A tag provided with means for securing the same temporarily to a stocking of a definite color or shade, said tag provided with a plurality of colored areas, each of the colors of which areas harmonize with the color of the stocking to which it is intended to be secured.

5. A merchandizing tag adapted to be secured to a colored fabric to assist the purchaser of the fabric in the selection of colors which will harmonize with the color of the fabric to which the tag is secured, said tag provided with a plurality of colored areas, each color of said areas harmonizing with a definite color or shade.

6. A chart adapted to accompany a pair of stockings to indicate a selection of colors which may be worn with the pair of stockings which it accompanies, said chart provided with a plurality of areas of different colors and each of which colors of said areas harmonizes with a single color.

Signed at Milwaukee in the county of Milwaukee, and State of Wisconsin this 24th day of April A. D. 1928.

JOHN E. FITZGIBBON.